April 22, 1924.
M. E. LAYNE ET AL
1,491,150
ROTARY PUMP BEARING
Filed April 18, 1923
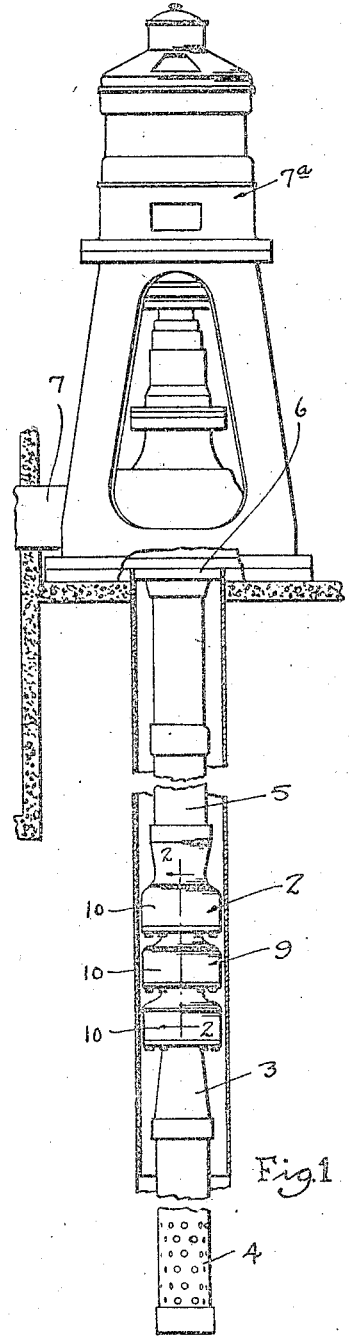
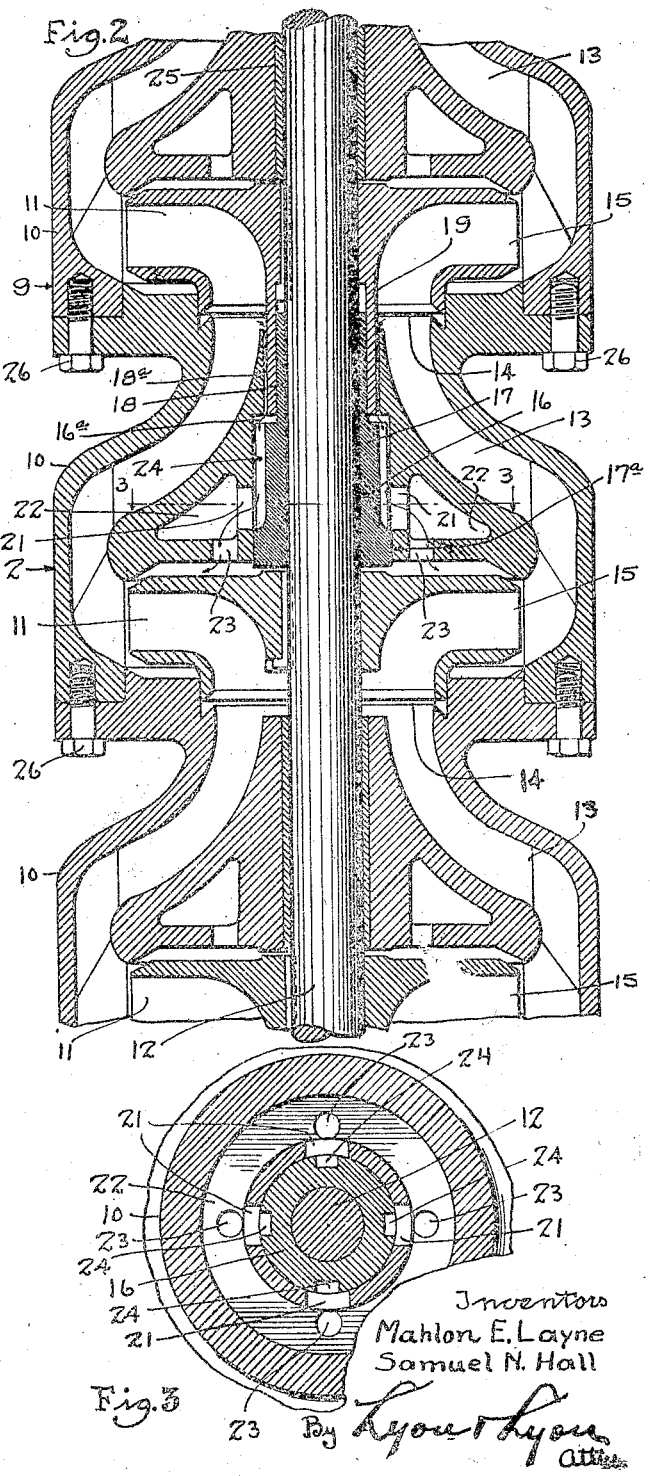
Inventors
Mahlon E. Layne
Samuel N. Hall
By Lyon & Lyon
Attys.

Patented Apr. 22, 1924.

1,491,150

UNITED STATES PATENT OFFICE.

MAHLON E. LAYNE, OF HOUSTON, TEXAS, AND SAMUEL N. HALL, OF SOUTH PASADENA, CALIFORNIA, ASSIGNORS TO LAYNE & BOWLER CORPORATION, OF LOS ANGELES, CALIFORNIA, A CORPORATION OF CALIFORNIA.

ROTARY-PUMP BEARING.

Application filed April 13, 1923. Serial No. 632,337.

*To all whom it may concern:*

Be it known that we, MAHLON E. LAYNE, a citizen of the United States, residing at Houston, in the county of Harris and State of Texas, and SAMUEL N. HALL, a citizen of the United States, residing at South Pasadena, in the county of Los Angeles and State of California, have invented a new and useful Rotary-Pump Bearing, of which the following is a specification.

This invention relates to bearings for rotary pumps and particularly refers to bearings for rotary pumps of the type employed in deep water wells and the like.

An object of this invention is to provide a bearing for a rotary pump with means to reduce the fluid pressure tending to force the fluid along the wearing surface of the bearing to the end that the destruction of such bearings and the actuating shaft of the pump by the fluid, and its accompanying foreign matter, may be eliminated, and to the end that the efficiency and life of the pump may be materially increased.

In practically all cases the fluid being pumped from the well carries with it a certain amount of foreign matter such as sand, which, if permitted to circulate along the wearing surface of the pump bearings, rapidly wears and destroys the bearings and actuating shaft. The fluid also frequently contains a quantity of acid which if circulated along the wearing surface of the bearings will corrode the bearings and actuating shaft. Since the bearings are commonly positioned a considerable distance below the surface of the ground, the bearings cannot be inspected, removed and renewed without withdrawing and reinstalling the pump with correspondingly large expense and loss of time. A large number of deep well pumps are used in irrigation work, where the pumps are relied upon to irrigate various crops. The wearing or corrosion of one of the pump bearings may cut off the supply of water from the well at a critical time and result in great loss to the owner of the well.

This invention comprehends that if the fluid pressure on both ends of the bearings is maintained equal, the circulation through the bearings will be eliminated and thereby the destruction of the bearings and actuating shaft prevented. Normally one end of a pump bearing is subjected to greater pressure than the other end, which pressure causes the circulation of fluid therethrough. If there is provided a small by-pass having slightly less resistance to the circulation of fluid therethrough than the resistance of the wearing surface of the bearing, receiving the fluid otherwise tending to pass through the bearing and conducting the same to the fluid passage adjacent the end of the bearing subjected to lower pressure, such by-pass will serve as a pressure equalizing means to equalize the pressure at both ends of the bearing.

The invention further comprehends that if the end of the bearing adjacent the fluid passage whereat the fluid has the highest operating pressure, is inclosed in a tubular member from direct contact with the fluid in the passage, the tubular member will materially aid in eliminating circulation through the bearing and will co-operate with the pressure equalizing by-pass for that purpose.

The objects and advantages of this invention will be understood from the description of the accompanying drawings which illustrate one example of a rotary pump mechanism embodying the invention.

In the drawings,

Figure 1 is an elevation of a pump mechanism embodying the invention showing a well in longitudinal section.

Fig. 2 is a section on the line 2—2 of Fig. 1.

Fig. 3 is a section on the line 3—3 of Fig. 2.

Referring to the drawings, the pump proper is generally indicated by 2. 3 indicates the inlet pipe leading to the pump, which terminates in the water bearing strata of the well in a perforated section 4. The upper end of the pump is connected to a water discharge casing 5 preferably built in sections, which casing 5 supports the pump from a suitable frame 6 positioned at the top of the well. 7 indicates a lateral discharge casing communicating with the casing 5. The actuating shaft of the pump extends from the pump through the discharge casing 5 and is connected at the top of the well to a suitable driving means, such as an electric motor, generally indicated by a housing 7ª.

The invention is not dependent on the mechanism for operating the pump, but resides in the pump 2 proper, and particularly in the bearings for the same. The pump 2 includes a pump casing 9 which preferably includes a plurality of unit pump casings or housings 10, each of which enclose an impeller 11, keyed to the common actuating shaft 12. An annular fluid passage 13 is provided throughout the pump, which passage is contorted to deliver the fluid to the center of each impeller housing 10 at the lower or inlet end 14 thereof and to receive the fluid from the periphery of the impeller at the discharge end 15 thereof. The impeller housings 10 are held together by suitable means such as bolts 26.

The actuating shaft 12 is provided with a bearing 16 which extends between two of the impellers 11 and is supported by the interior of the pump casing 10. Said bearing preferably provides two offset portions, the lower portion 17 being of larger exterior diameter than the upper portion 18. Said bearing 16 fits in a recess 16$^a$ in the pump casing 10, the lower end 17$^a$ of said recess engaging the bearing and the bore of the upper portion 18$^a$ being spaced from the upper portion 18 of the bearing. A tubular member 19, preferably having an integral connection with the impeller 11, disposed above said bearing, extends between the upper portion 18$^a$ of the recess 16$^a$ and the upper portion 18 of the bearing 16. Said tubular member 19 serves to enclose the upper end of the bearing 16 from direct communication with the fluid passage 13. Said tubular member 19 but loosely engages the bearing to guide or center the impeller 11 and to retard the flow of fluid to the end of the bearing 16, and said tubular member 19 is of slightly less diameter than the bore of portion 18$^a$ of the recess 16$^a$, so that no material wearing of said member 19 against the pump casing occurs during operation of the pump. The lower portion 17 of the bearing 16 is provided at its periphery with a plurality of vertically extending recesses 24 which form by-passes for the fluid and which communicate with horizontal ducts 21 provided in the casing 10. Said ducts 21 in turn communicate through the cored interior 22 of the casing 10 with vertically extending ducts 23 communicating with the fluid passage 13 near the center of the pump.

Since the fluid which may pass down between the pump casing 10 and the tubular member 19 freely communicates with the passage 13 at a point of lower operating pressure, the tendency of the fluid to rise between the tubular member 19 and exterior of the bearing 16 and hence to flow down along the wearing surfaces, is substantially eliminated, and the life of the pump accordingly increased.

In the drawings only the center housing 10 of the pump is illustrated as provided with a bearing having the pressure relieving by-pass. If preferred, however, each of the housings 10 may be provided with bearings having means relieving the pressure tending to force fluid therethrough. As shown, each of the upper and lower housings 10 are provided with plain bushings 25 along the actuating shaft 12. Preferably such bushings 25 should be relatively loose around the actuating shaft 12 to prevent wear in operation. The main support of the actuating shaft is by the bearing 16. The impellers 11 should fit closely to the shaft to prevent circulation of fluid between their inner surfaces and the surface of the actuating shaft 12.

While the pump bearing heretofore described is a practical example of one embodiment of the invention, various modifications in the details of construction of the pump may be made without departing from the spirit of the invention. This invention is not limited to the embodiment shown, but is of the scope set forth in the following claims.

We claim:

1. In a centrifugal pump, the combination of a pump casing, a rotable shaft mounted therein and provided with an impeller, a bearing for the shaft adjacent the impeller, and means for reducing the fluid pressure on the one end of the bearing to substantially the pressure on the other end, whereby circulation of fluid along the wearing surfaces of said bearing is substantially eliminated.

2. In a centrifugal pump, the combination with a rotary shaft, an impeller carried by the shaft, and a pump casing enclosing the impeller and providing a fluid passage-way adapted to deliver fluid to said impeller and receive the fluid therefrom, of a bearing for the shaft, and a pressure relieving by-pass communicating with said passage-way at the point of higher pressure on said bearing and communicating with the fluid passage-way at a point of relatively lower pressure.

3. In a centrifugal pump, a pump casing, a rotatable shaft mounted therein, an impeller carried by the shaft, a bearing for the shaft within the pump casing, a tubular member enclosing one end of the bearing, and pressure releasing means cooperating with the tubular member to prevent circulation of fluid through said bearing.

4. In a centrifugal pump, a rotary shaft, a bearing for the shaft, a tubular member enclosing one end of the bearing from direct contact with the fluid in the pump, and a pressure relieving by-pass co-operating with said tubular member to prevent circulation of fluid through said bearing.

5. In a rotary pump, the combination with a pump housing having a water passage, of a plurality of impellers enclosed within the casing for stepping up the pressure of water in the passage, a shaft mounting the impellers, a bearing for the shaft disposed between adjacent impellers, and means for reducing the pressure tending to force fluid along the wearing surface of the bearing to the low pressure end of the bearing.

6. In a rotary pump, a pump casing providing a fluid passage, an impeller enclosed in said casing, an actuating shaft for the impeller, a bearing for the actuating shaft, said bearing being positioned adjacent said impeller and having its upper end enclosed by a tubular extension of said impeller, and a by-pass from the end of the tubular member and communicating with the passage adjacent the other end of the bearing.

7. In a rotary pump, a pump casing having a fluid passage-way, an impeller enclosed in the casing, an actuating shaft for the impeller, a bearing for the shaft, said bearing having a portion engaging the pump casing and a portion spaced from said pump casing, a tubular extension on the impeller enclosing one portion of said bearing and substantially filling the space between said portion and the pump casing, and a by-pass co-operating with said tubular member to reduce the pressure on the bearing.

8. In a rotary pump, a pump casing providing a fluid passage, a plurality of impellers in the casing, an actuating shaft for the impellers, a bearing for the shaft, said bearing being disposed between adjacent impellers, and a pressure relieving by-pass adapted to substantially equalize the pressures at opposed ends of the bearing.

9. In a rotary pump, a shaft, a plurality of impellers carried by its shaft, a pump casing providing a fluid passage to and from said impellers, a bearing for the shaft and disposed between adjacent impellers, a tubular extension from an impeller enclosing one end of the bearing, and means for reducing the pressure of one end of the bearing to substantially the pressure at the opposed end.

Signed at Los Angeles, Cal., this 9th day of April, 1923.

MAHLON E. LAYNE.
SAMUEL N. HALL.